(12) United States Patent
Choi

(10) Patent No.: US 8,090,236 B2
(45) Date of Patent: Jan. 3, 2012

(54) OPTICAL RECORD/PLAYBACK APPARATUS AND CONTROL METHOD THEREOF

(75) Inventor: Kyung Suk Choi, Seongnam-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 1054 days.

(21) Appl. No.: 11/850,890

(22) Filed: Sep. 6, 2007

(65) Prior Publication Data

US 2008/0166108 A1    Jul. 10, 2008

(30) Foreign Application Priority Data

Jan. 9, 2007  (KR) .................. 10-2007-0002628

(51) Int. Cl.
- H04N 9/80 (2006.01)
- G06F 17/00 (2006.01)
- G06F 17/20 (2006.01)
- G06F 17/21 (2006.01)
- G06F 17/22 (2006.01)
- G06F 17/24 (2006.01)
- G06F 17/25 (2006.01)
- G06F 17/26 (2006.01)
- G06F 17/27 (2006.01)
- G06F 17/28 (2006.01)
- G06F 3/00 (2006.01)

(52) U.S. Cl. ........ 386/239; 386/248; 715/201; 715/700; 715/716; 715/718

(58) Field of Classification Search .................. 386/326, 386/332, 334, 361, 239, 248; 715/201, 700, 715/716, 718
See application file for complete search history.

(56) References Cited

U.S. PATENT DOCUMENTS

| | | | | |
|---|---|---|---|---|
| 4,855,842 A | * | 8/1989 | Hayes et al. | 386/206 |
| 5,991,911 A | * | 11/1999 | Zook | 714/758 |
| 2003/0236582 A1 | * | 12/2003 | Zamir et al. | 700/94 |
| 2004/0111538 A1 | * | 6/2004 | Miyazaki | 710/10 |
| 2004/0189827 A1 | * | 9/2004 | Kim et al. | 348/231.4 |
| 2004/0220791 A1 | * | 11/2004 | Lamkin et al. | 703/11 |
| 2005/0063278 A1 | * | 3/2005 | Kim | 369/70 |
| 2006/0240871 A1 | * | 10/2006 | Konetski et al. | 455/563 |

FOREIGN PATENT DOCUMENTS

| | | |
|---|---|---|
| JP | 6266518 | 9/1994 |
| JP | 2002057959 | 2/2002 |
| JP | 2004110962 | 4/2004 |
| KR | 2004-13588 | 2/2004 |
| KR | 2004-13856 | 2/2004 |
| KR | 2006-67342 | 6/2006 |

OTHER PUBLICATIONS

Korean Office Action issued Feb. 18, 2011 in KR Application No. 10-2007-0002628.

* cited by examiner

*Primary Examiner* — Thai Tran
*Assistant Examiner* — Hung Dang
(74) *Attorney, Agent, or Firm* — Stanzione & Kim, LLP

(57) ABSTRACT

An optical record/playback apparatus and a control method thereof are disclosed. The optical record/playback apparatus has an easy mode to automatically initialize an optical disk loaded on the optical record/playback apparatus, regardless of a type of an optical disk, when the optical disk has not been initialized, and the easy mode set to display a same main menu when a menu button is manipulated.

17 Claims, 7 Drawing Sheets

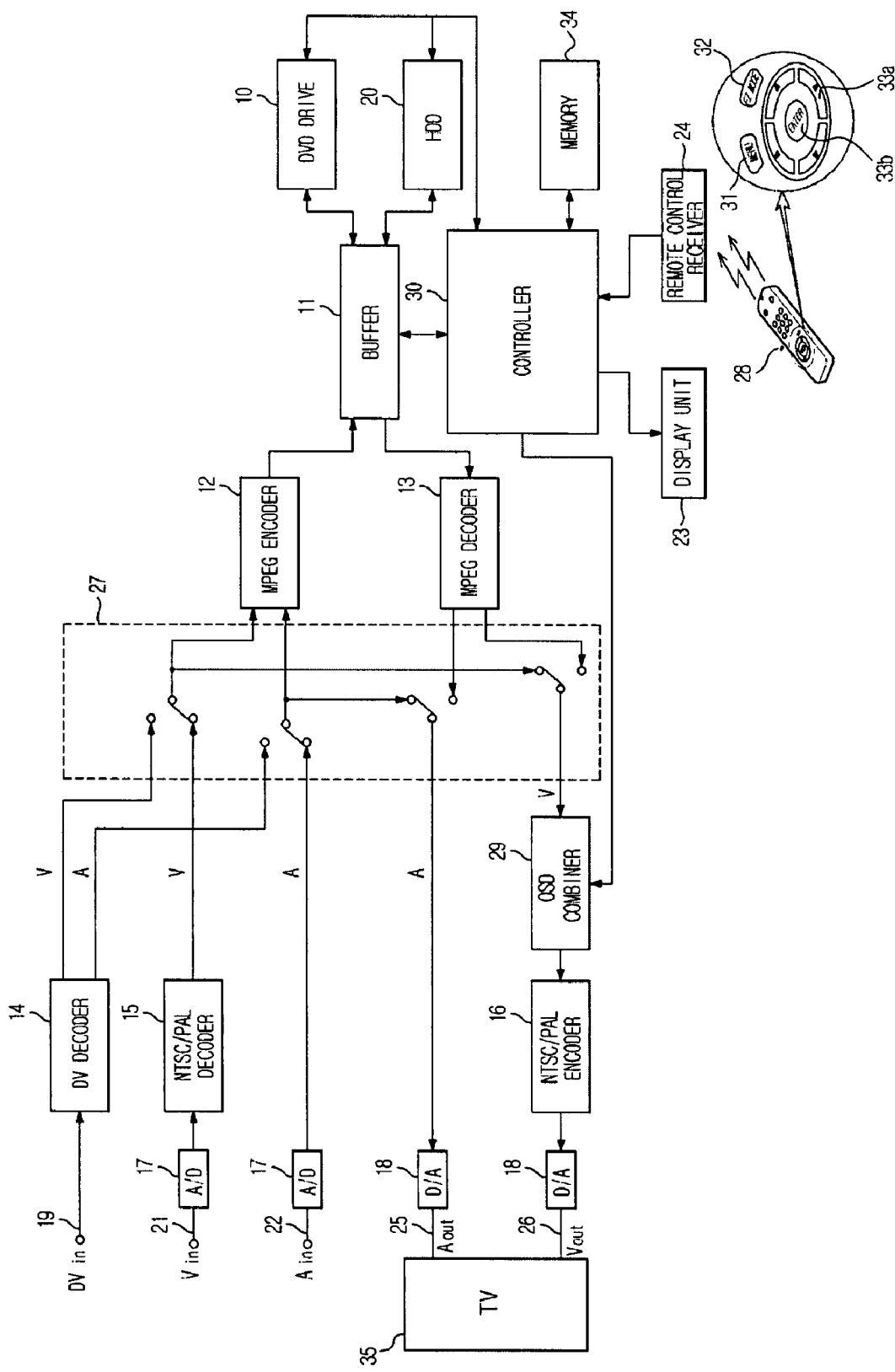

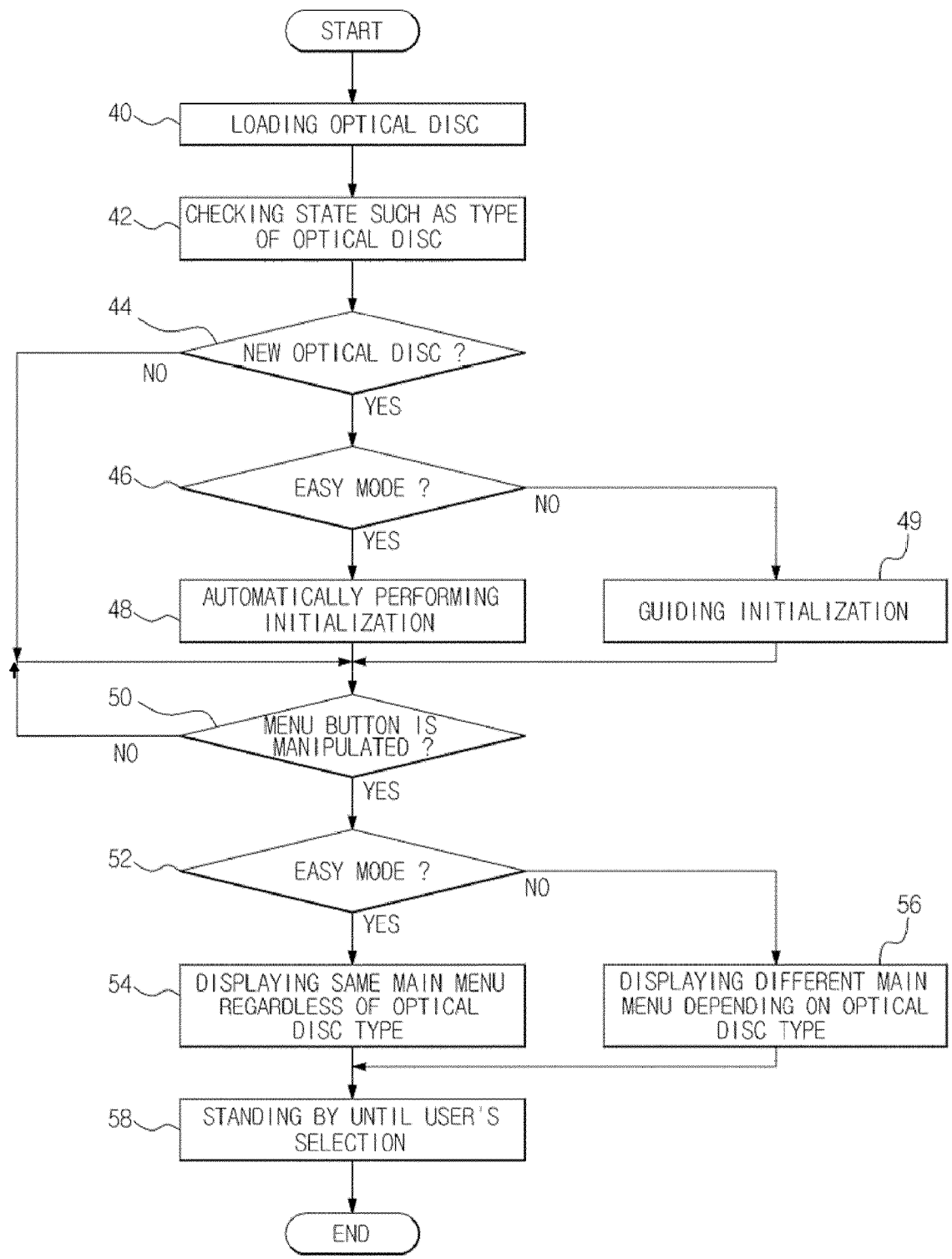

FIG. 3A

Press "On" to confirm EZ REC mode
Otherwise press "Off"

| On | Off |

FIG. 3B

Uninitialized Disc

Do you want to initialize this disc?

| Yes | No |

OPTICAL RECORD/PLAYBACK APPARATUS AND CONTROL METHOD THEREOF

CROSS-REFERENCE TO RELATED APPLICATIONS

This application claims priority under 35 U.S.C. §119(a) from Korean Patent Application No. 2007-0002628, filed on Jan. 9, 2007 in the Korean Intellectual Property Office, the disclosure of which is incorporated herein in its entirety by reference.

BACKGROUND OF THE INVENTION

1. Field of the Invention

The present general inventive concept relates to an optical record/playback apparatus and a control method thereof, and more particularly to an optical record/playback apparatus having an easy mode for user convenience and a control method thereof.

2. Description of the Related Art

In general, an optical record/playback apparatus is used to record or play back various kinds of images or voices. Korean Patent Laid-open Publication No. 2004-13855 entitled "Apparatus for recording and playing video and method for displaying menu guide thereof" discloses an optical record/playback apparatus which is connected to a display unit for displaying a menu guide on the screen so that a user can easily perform recording, playing, and the like.

For example, in a conventional optical record/playback apparatus, when the user presses a menu button, a main menu is displayed on the screen as illustrated in FIG. 4 of Korean Patent Laid-open Publication No. 2004-13855. When the user selects a category from the main menu, a sub-menu belonging to the selected category is displayed. Then, the user finally selects an item from the sub-menu and an operation corresponding to the finally selected item is performed.

However, since a conventional optical record/playback apparatus provides a main menu varying according to the type of optical disk loaded thereon, it can confuse users unskilled in using the optical record/playback apparatus. That is, when a different main menu is provided depending on the type of optical disk, unskillful users can determine that the apparatus is malfunctioning and complain to a manufacturer even though the apparatus is properly operating.

Meanwhile, when the loaded optical disk is an optical disk on which an initialization (operation for initializing the optical disk to be usable) is not performed, independently of displaying the above-mentioned main menu, the conventional optical record/playback apparatus informs the user that the loaded optical disk has not been initialized. Then, if the user selects an initialization mode, the initialization is performed on the optical disk in the selected initialization mode (see Description of the Related Art of Korean Patent Laid-open Publication No. 2006-67342).

However, when performing the initialization, similarly as when displaying the different main menu, unskillful users who are unfamiliar with initialization have difficulty in determining whether the initialization is performed or in setting the initialization mode. Thus, in such a case, the optical disk cannot be initialized appropriately.

SUMMARY OF THE INVENTION

The present general inventive concept provides an optical record/playback apparatus having an easy mode in which a same main menu is provided independent of a type of an optical disk and the optical disk is automatically initialized if necessary, and a control method thereof.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may also be achieved by providing an optical record/playback apparatus including an easy mode to display a same main menu regardless of a type of an optical disk loaded on the optical record/playback apparatus when a menu button is manipulated.

An easy mode button may be disposed on one of a remote controller and a housing of the optical record/playback apparatus to set the easy mode.

The foregoing and/or other aspects and utilities of the general inventive concept may also be achieved by providing an optical record/playback apparatus including an easy mode to automatically initialize an optical disk loaded on the optical record/playback apparatus, regardless of a type of an optical disk, when the optical disk has not been initialized.

Initialization modes set respectively according to types of optical disks may be stored in the optical record/playback apparatus, and each of the optical disks may be initialized in a corresponding one of the initialization modes.

An initialization status of the optical disk may be displayed for a user while the optical disk is initialized.

The foregoing and/or other aspects and utilities of the general inventive concept may also be achieved by providing an optical record/playback apparatus including an easy mode to automatically initialize an optical disk loaded on the optical record/playback apparatus, regardless of a type of an optical disk, when the optical disk has not been initialized, the easy mode set to display a same main menu when a menu button is manipulated.

The foregoing and/or other aspects and utilities of the general inventive concept may also be achieved by providing a control method of an optical record/playback apparatus, the method including determining whether the optical record/playback apparatus is in an easy mode when an optical disk is loaded on the optical record/playback apparatus and a menu button is manipulated, and displaying a same main menu regardless of a type of an optical disk when the optical record/playback apparatus is in the easy mode.

The foregoing and/or other aspects and utilities of the general inventive concept may also be achieved by providing a control method of an optical record/playback apparatus, the method including checking a type of an optical disk and whether the optical disk has been initialized when the optical disk is loaded on the optical record/playback apparatus, determining whether the optical record/playback apparatus is in an easy mode, and automatically initializing the optical disk when the optical disk has not been initialized and the optical record/playback apparatus is in the easy mode.

The foregoing and/or other aspects and utilities of the general inventive concept may also be achieved by providing a control method of an optical record/playback apparatus, the method including checking a type of an optical disk and whether the optical disk has been initialized when the optical disk is loaded on the optical record/playback apparatus, determining whether the optical record/playback apparatus is in an easy mode, automatically initializing the optical disk when the optical disk has not been initialized and the optical record/playback apparatus is in the easy mode, determining whether a menu button has been manipulated, determining again whether the optical record/playback apparatus is in the easy mode when the menu button has been manipulated, and displaying a same main menu regardless of a type of an optical disk when the optical record/playback apparatus is in the easy mode.

The foregoing and/or other aspects and utilities of the general inventive concept may also be achieved by providing record/playback apparatus, including a loading unit to load a disk, and an easy mode to display a main menu independent of a type of the disk loaded by the loading unit.

The foregoing and/or other aspects and utilities of the general inventive concept may also be achieved by providing a record/playback apparatus, including a loading unit to load a disk, and an easy mode to automatically initialize the disk loaded by the loading unit independent of a type of the disk, when the disk loaded has not been initialized.

The foregoing and/or other aspects and utilities of the general inventive concept may also be achieved by providing a record/playback apparatus usable with a display unit, the apparatus including a loading unit to load a disk, and a controller to place the recording/playback apparatus in one of an easy mode and a custom mode, wherein the easy mode display a main menu independent of a type of the disk loaded by the loading unit.

The foregoing and/or other aspects and utilities of the general inventive concept may also be achieved by providing a method of operating a record/playback apparatus, the method comprising: apparatus including loading a disk, and placing the recording/playback apparatus in one of an easy mode to display a main menu independent of a type of the disk loaded by the loading unit and a custom mode to display a menu corresponding to the type of disk loaded by the loading unit.

The foregoing and/or other aspects and utilities of the general inventive concept may also be achieved by providing a computer-readable recording medium having embodied thereon a computer program to execute a method, wherein the method includes loading a disk, and placing a recording/playback apparatus in one of an easy mode to display a main menu independent of a type of the disk loaded by the loading unit and a custom mode to display a menu corresponding to the type of disk loaded by the loading unit.

BRIEF DESCRIPTION OF THE DRAWINGS

These and/or other aspects and utilities of exemplary embodiments of the general inventive concept will become apparent and more readily appreciated from the following description of the embodiments, taken in conjunction with the accompanying drawings, of which:

FIG. 1 is a block diagram illustrating an optical record/playback apparatus in accordance with an embodiment of the present general inventive concept; and FIG. 2 is a flowchart illustrating a control method of the optical record/playback apparatus in accordance with an embodiment of the present general inventive concept; and FIGS. 3A to 3E illustrate various on screen display (OSD) messages used in the control method illustrated in FIG. 2.

DETAILED DESCRIPTION OF THE PREFERRED EMBODIMENTS

Figure 3C:
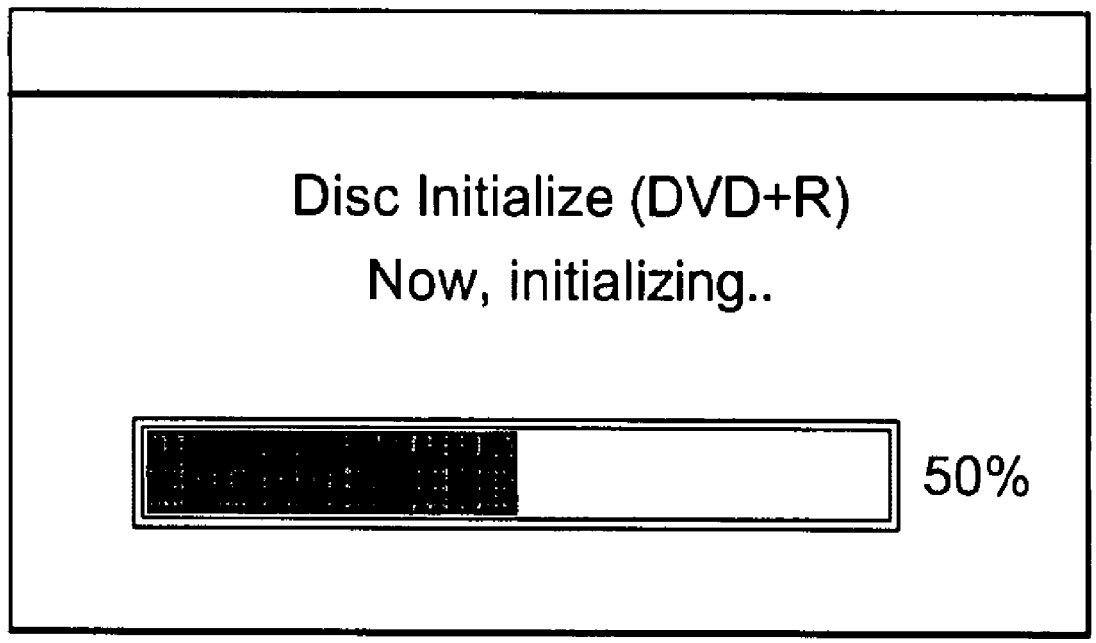

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

As illustrated in FIG. 1, an optical record/playback apparatus in accordance with an embodiment of the present general inventive concept includes a plurality of input terminals 19, 21 and 22, a plurality of output terminals 25 and 26, a plurality of A/D and D/A converters 17 and 18, a DV decoder 14, an NTSC/PAL decoder 15, and an NTSC/PAL encoder 16. Further, the optical record/playback apparatus includes a switching circuit 27, an MPEG encoder 12, an MPEG decoder 13, a controller 30, an On Screen Display (OSD) combiner 29, a buffer 11, a DVD drive 10, a HDD 20, a display unit 23, a remote control receiver 24, and a memory 34.

The input terminals include a digital interface terminal (DVin) 19, a video input terminal (Vin) 21, and an audio input terminal (Ain) 22. AV data in a digital video (DV) format are input to the digital interface terminal (DVin) 19. A video signal in an NTSC/PAL format or the like is input to the video input terminal 21. Further, an audio signal is input to the audio input terminal (Ain) 22.

The output terminals include an audio output terminal (Aout) 25 and a video output terminal (Vout) 26. The audio output terminal (Aout) 25 transmits the audio signal to a TV 35 connected to the terminals 25 and 26. The video output terminal 26 transmits the video signal in the NTSC/PAL format or the like to the TV 35.

The DV decoder 14 converts the AV data in the digital video (DV) format input to the digital interface terminal (DVin) 19 into video and audio signals in an International Telecommunication Union (ITU)-R BT format. The NTSC/PAL decoder 15 converts the video signal in the NTSC/PAL format input to the video input terminal 21 into the video signal in the ITU-R BT format. The NTSC/PAL encoder 16 converts the video signal in the ITU-R BT format output from the MPEG decoder 13 into the video signal in the NTSC/PAL format.

When recoding the AV data input to the video input terminal (Vin) 21 and the audio input terminal (Ain) 22, the switching circuit 27 transmits the video signal output from the NTSC/PAL decoder 15 to the MPEG encoder 12 and the OSD combiner 29, and transmits the audio signal input to the audio input terminal (Ain) 22 to the MPEG encoder 12 and the audio output terminal (Aout) 25. Further, when recoding AV data in the digital video (DV) format, the switching circuit 27 transmits the video signal output from the DV decoder 14 to the MPEG encoder 12 and the OSD combiner 29, and transmits the audio signal output from the DV decoder 14 to the MPEG encoder 12 and the audio output terminal (Aout) 25. When playing back, the switching circuit 27 transmits the video signal output from the MPEG decoder 13 to the OSD combiner 29, and transmits the audio signal output from the MPEG decoder 13 to the audio output terminal (Aout) 25.

The MPEG encoder 12 produces an AV data stream by compressing and encoding the video signal in the ITU-R BT format and a digitalized audio signal using an MPEG-2 scheme. Alternatively, the MPEG decoder 13 converts the AV data stream into the video signal in the ITU-R BT format.

The controller 30 controls respective units of the optical record/playback apparatus. Also, the controller 30 forms an OSD image to be displayed on the TV 35 connected to the optical record/playback apparatus, and provides the OSD image to the OSD combiner 29. Then, the OSD combiner 29 combines the video signal to be reproduced with the OSD image. The buffer 11 temporarily stores the AV data stream. The DVD drive 10 records data on a DVD loaded thereon, or reads the data from the DVD. The HDD 20 stores a variety of data independently of the DVD drive 10.

The remote control receiver 24 receives a signal from a remote controller 28, and transmits the received signal to the controller 30. The remote controller 28 includes a menu button 31 to display a menu screen, an easy mode button (EZ mode button) 32 to set an easy mode, and the like. The EZ mode button 32 may be additionally disposed on a front surface of a housing (not illustrated) of the optical record/playback apparatus. When the user presses the EZ mode button 32, as illustrated in FIGS. 1 and 3A, an OSD message is displayed on the TV 35. The user selects an ON button or OFF button by using direction buttons 33a and an enter button 33b so as to set or cancel the easy mode.

In the easy mode, when the user presses the menu button 31, a same main menu is provided regardless of a type of an optical disk. Further, in the easy mode, when a new optical disk which has not been initialized is loaded, the loaded optical disk is automatically initialized. The easy mode will be described in detail with reference to FIG. 2.

The memory 34 stores initialization modes corresponding to types of optical disks. When the respective optical disk is automatically initialized in the easy mode, the controller 30 initializes the optical disk in an initialization mode corresponding to the optical disk, which is stored in the memory 34. For example, if the initialization mode of a DVD-RW disk stored in the memory 34 is a VR mode, the controller 30 initializes the DVD-RW disk in the VR mode. If the initialization mode of a DVD-R disk stored in the memory 34 is a V mode, the controller 30 initializes the DVD-R disk in the V mode.

Hereinafter, a control method of the optical record/playback apparatus will be described with reference to FIG. 2 and FIGS. 3B to 3E in accordance with an embodiment of the present general inventive concept. When the optical disk is loaded on a powered optical record/playback apparatus (operation S40), the DVD drive 10 reads information recorded in an information area of the optical disk and the controller 30 analyzes signals transmitted from the DVD drive 10 to check a state of the optical disk (e.g., an optical disk type) (operation S42).

Then, the controller 30 determines whether the loaded optical disk is a new optical disk which has not been initialized (operation S44). If it is determined that the loaded optical disk has been initialized, the process proceeds to operation S50. If it is determined that the loaded optical disk is a new optical disk which has not been initialized, the controller 30 determines whether the optical record/playback apparatus is in the easy mode (operation S46). If it is determined that the optical record/playback apparatus is not in the easy mode at operation S46, the controller 30 inquires whether the user wants to initialize the disk and if the user requires an initialization of the disk, the controller 30 performs the initialization of the disk (operation S49). At operation S49, for example, an OSD message can be displayed on the TV 35 as illustrated in FIG. 3B.

Alternatively, if it is determined that the optical record/playback apparatus is in the easy mode at operation S46, the controller 30 fetches an initialization mode corresponding to the optical disk type checked at operation S42 from the memory 34 and automatically initializes the optical disk in the initialization mode (operation S48). Accordingly, as illustrated in FIG. 3C, an OSD message illustrating progress of initialization can be displayed on the TV 35.

If the initialization of the optical disk is completed, the controller 30 determines whether the remote control receiver 24 detects manipulation of the menu button 31 of the remote controller 28 (operation S50). If it is determined that the manipulation of the menu button 31 is not detected, the process stands by. If it is determined that the manipulation of the menu button 31 is detected, the controller 30 determines again whether the optical record/playback apparatus is in the easy mode (operation S52).

Figure 3D:
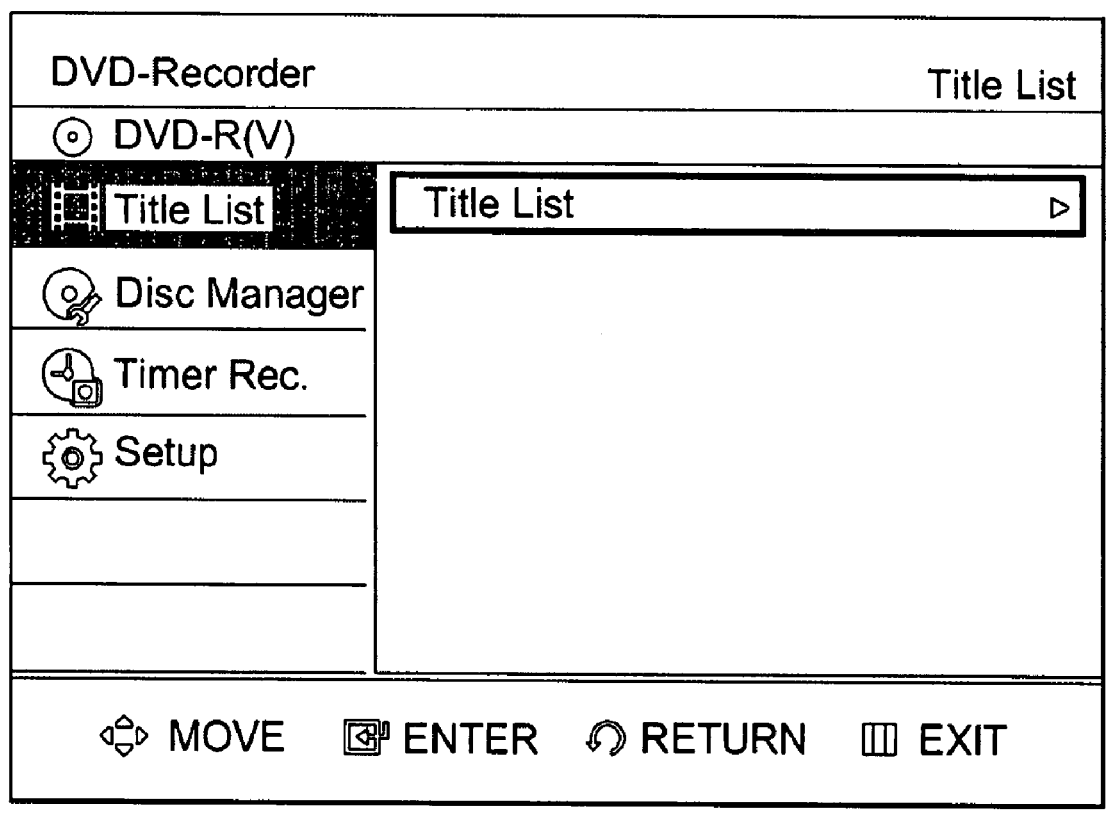
Figure 3E:
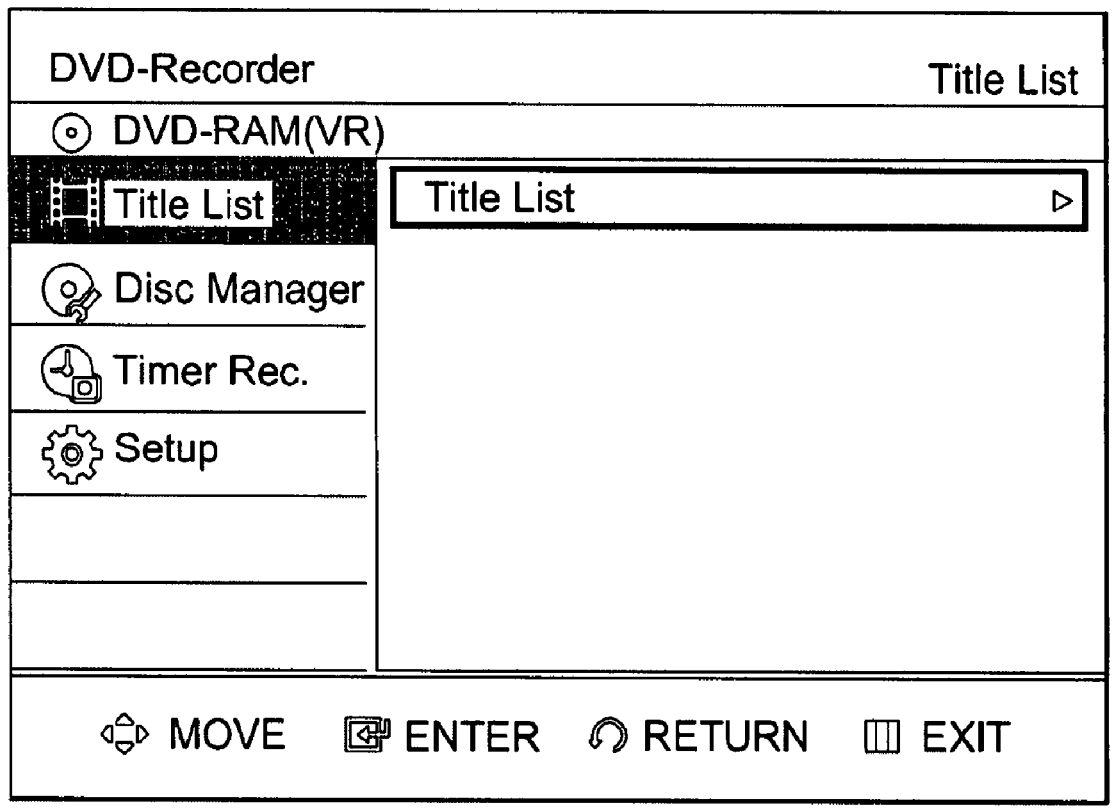

If it is determined that the optical record/playback apparatus is not in the easy mode at operation S52, a different main menu is displayed depending on the optical disk type (operation S56). For example, if a DVD-R disk is loaded on the optical record/playback apparatus, a main menu illustrated in FIG. 3D is displayed, and if a DVD-RAM disk is loaded on the optical record/playback apparatus, a main menu illustrated in FIG. 3E is displayed. Referring to FIGS. 3D and 3E, the main menu has different items depending on the optical disk type. Since the items of the main menu are well known, the description thereof is omitted.

Alternatively, if it is determined that the optical record/playback apparatus is in the easy mode at operation S52, the same main menu is displayed regardless of the optical disk type (operation S54). Accordingly, for example, the main menu illustrated in FIG. 3D is displayed while varying the type and the initialization mode of the optical disk displayed in an upper portion of the screen.

If the main menu is displayed on the TV 35, the process stands by until the user selects a specific item of the main menu (operation S58).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the present general inventive concept provides an optical record/playback apparatus having an easy mode in which a same main menu is displayed regardless of a type of an optical disk to thereby prevent a user from being confused due to a main menu varying according to the optical disk type.

Further, in the easy mode, the optical disk is automatically initialized if necessary, whereby a user unskilled in initializing the optical disk can easily use the optical record/playback apparatus.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An optical record/playback apparatus, comprising:
   a loading unit configured to receive different types of optical disks;

a first mode button to receive a user command to set a first mode;
a main menu button to receive a user command to display a main menu; and
a controller to determine if the user command to set the first mode is received and when the user command to display the main menu is received, to generate the main menu as a common main menu regardless of the type of optical disc received in the loading unit if the user command to set the first mode is received and to generate the main menu as a main menu corresponding to the type of optical disk received if the user command to set the first mode is not received.

2. The apparatus according to claim 1, wherein the first mode button is disposed on one of a remote controller and a housing of the optical record/playback apparatus to set the first mode.

3. An optical record/playback apparatus, comprising:
a loading unit configured to receive different types of optical disks;
an first mode button to receive a user command to set a first mode; and
a controller to determine if the user command to set the first mode is received and when an optical disk is received in the loading unit, to automatically initialize the received optical disk if the user command to set the first mode is received and to generate a menu to inquire whether to initialize the optical disk if the user command to set the first mode is not received.

4. The apparatus according to claim 3, wherein initialization modes set respectively corresponding to types of optical disks are stored in the optical record/playback apparatus, and each of the optical discs is initialized in a corresponding one of the initialization modes.

5. The apparatus according to claim 3, wherein an initialization status of the optical disk is displayed for a user while the optical disk is initialized.

6. An optical record/playback apparatus, comprising:
a loading unit configured to receive different types of optical disks;
a first mode button to receive a user command to set a first mode;
a main menu button to receive a user command to display a main menu; and
a controller to determine if the user command to set the first mode is received and when an optical disk is received in the loading unit, to automatically initialize the received optical disk if the user command to set the first mode is received and to venerate a menu to inquire whether to initialize the optical disk if the user command to set the first mode is not received, and when the user command to display the main menu is received, to generate the main menu as a common main menu regardless of the type of optical disk received in the loading unit if the user command to set the first mode is received and to generate the main menu as a main menu corresponding to the type of optical disk received if the user command to set the first mode is not received.

7. A control method of an optical record/playback apparatus, the method comprising:
determining whether the optical record/playback apparatus is in a first mode when an optical disk is loaded on the optical record/playback apparatus and a menu button is manipulated; and
when the menu button is manipulated, displaying a common main menu regardless of a type of an optical disk when the optical record/playback apparatus is in the first mode an displaying a main menu corresponding to the type of the optical disk when the optical record/playback apparatus is not in the first mode.

8. A control method of an optical record/playback apparatus, the method comprising:
checking a type of an optical disk and whether the optical disk has been initialized when the optical disk is loaded on the optical record/playback apparatus;
determining whether the optical record/playback apparatus is in a first mode; and
automatically initializing the optical disk when the optical disk has not been initialized and the optical record/playback apparatus is in the first mode and generating a menu to inquire whether to initialize the optical disk when the optical disk has not been initialized and the optical record/playback apparatus is not in the first mode.

9. A control method of an optical record/playback apparatus, the method comprising:
checking a type of an optical disk and whether the optical disk has been initialized when the optical disk is loaded on the optical record/playback apparatus;
determining whether the optical record/playback apparatus is in a first mode;
automatically initializing the optical disk when the optical disk has not been initialized and the optical record/playback apparatus is in the first mode and generating a menu to inquire whether to initialize the optical disk when the optical disk has not been initialized and the optical record/playback apparatus is not in the first mode;
determining whether a menu button has been manipulated;
determining again whether the optical record/playback apparatus is in the first mode when the menu button has been manipulated; and
displaying a common main menu regardless of a type of an optical disk when the optical record/playback apparatus is in the first mode and displaying a main menu corresponding to the type of the optical disk when the optical record/playback apparatus is not in the first mode.

10. A record/playback apparatus, comprising:
a loading unit to load a disk;
a first mode button to receive a user command to set a first mode;
a main menu button to receive a user command to display a main menu; and
a controller to determine if the user command to set the first mode is received and when the user command to display the main menu is received, to generate the main menu independent of a type of the disk loaded by the loading unit if the user command to set the first mode is received and to generate the main menu according to the type of disk loaded by the loading unit if the user command to set the first mode is not received.

11. The apparatus of claim 10, wherein the main menu is displayed in response to a menu button being manipulated.

12. A record/playback apparatus, comprising:
a loading unit to load a disk;
a first mode button to receive a user command to set a first mode; and
a controller to determine if the user command to set the first mode is received and when the disk loaded has not been initialized, to automatically initialize the disk loaded by the loading unit independent of a type of the disk if the user command to set the first mode is received and to generate a menu to inquire whether to initialize the disk if the user command to set the first mode is not received.

13. The apparatus of claim 12, further comprising:
a storing unit to store initialization modes corresponding to various types of disks such that each of the types of disks is initialized in a corresponding one of the initialization modes.

14. A record/playback apparatus usable with a display unit, the apparatus comprising:
a loading unit to load a disk;
a first mode button to receive a user command to set a first mode;
a main menu button to receive a user command to display a main menu; and
a controller to determine if the user command to set the first mode is received and to place the record/playback apparatus in the first mode if the user command to set the first mode is received and to place the record/playback apparatus in a custom mode if the user command to set the first mode is not received, and when the user command to display the main menu is received to generate the main menu as a common main menu independent of a type of the disk loaded by the loading unit if the record/playback apparatus is in the first mode and to generate the main menu according to the type of disk loaded by the loading unit if the record/playback apparatus is in the custom mode.

15. The apparatus of claim 14, wherein the custom mode displays a menu corresponding to the type of disk loaded by the loading unit.

16. A method of operating a record/playback apparatus, the method comprising:
loading a disk;
determining if a user command to set a first mode of the record/playback apparatus is received;
placing the record/playback apparatus in the first mode if the user command to set the first mode of the record/playback apparatus is received and placing the record/playback apparatus in a custom mode if the user command to set the first mode is not received;
determining if a user command to display a main menu is received; and
when the user command to display the main menu is received, generating the main menu as a common main menu independent of a type of disk loaded if the record/playback apparatus is in the first mode and generating the main menu according to the type of disk loaded if the record/playback apparatus is not in the first mode.

17. A non-transitory computer-readable recording medium having embodied thereon a computer program to execute a method, wherein the method comprises:
loading a disk;
determining if a user command to set a first mode of a record/playback apparatus is received;
placing the record/playback apparatus in the first mode if the user command to set the first mode of the record/playback apparatus is received and placing the record/playback apparatus in custom mode if the user command to set the first mode is not received;
determining if a user command to display a main menu is received; and
when the user command to display the main menu is received, generating the main menu as a common main menu independent of a type of disk loaded if the record/playback apparatus is in the first mode and generating the main menu according to the type of disk loaded if the record/playback apparatus is not in the first mode.

* * * * *